(No Model.)

W. N. BLANCHARD.
EYEGLASSES.

No. 597,941. Patented Jan. 25, 1898.

Witnesses
F. L. Ourand.

Inventor
Wm N. Blanchard.
by 
Attorney

UNITED STATES PATENT OFFICE.

WILLIAM N. BLANCHARD, OF SOUTHBRIDGE, MASSACHUSETTS.

EYEGLASSES.

SPECIFICATION forming part of Letters Patent No. 597,941, dated January 25, 1898.

Application filed April 1, 1897. Serial No. 630,278. (No model.)

*To all whom it may concern:*

Be it known that I, WILLIAM N. BLANCHARD, a citizen of the United States, residing at Southbridge, in the county of Worcester and State of Massachusetts, have invented certain new and useful Improvements in Eyeglasses; and I do hereby declare the following to be a full, clear, and exact description of the invention, such as will enable others skilled in the art to which it appertains to make and use the same.

My invention relates to improvements in eyeglasses; and the main object of my invention is the provision of a means whereby the glasses are held in place firmly, yet with great comfort and ease, and which will not scar or bruise the bridge of the wearer's nose.

Another object of my invention is the provision of an eyeglass which has a bridge adjusting means, bent from wire, and has a spring arranged therewith to hold the glasses in place upon the nose, which will always preserve the parallelism of the lenses, and which is very simple and durable and by these advantages is rendered inexpensive, as well as useful and practical.

To attain the desired objects, the invention consists of an eyeglass embodying novel features of construction, substantially as disclosed herein.

Figure 1:
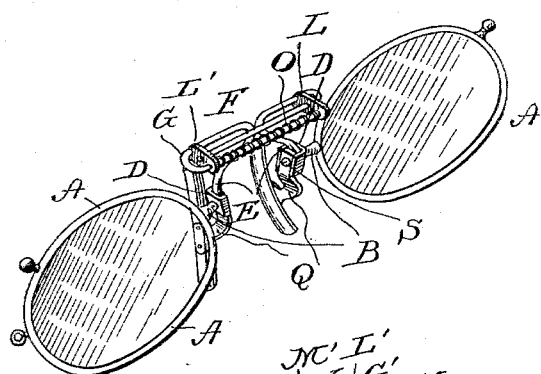
Figure 2:
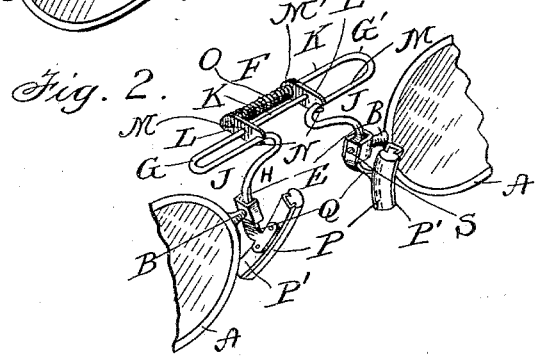

Figure 1 represents a perspective view of my improved eyeglass, looking downward from the front, with the lenses close together. Fig. 2 is a rear perspective view of my eyeglass with the lenses pushed apart as in the act of applying to the wearer's nose, and Fig. 3 is a perspective view of a modified form of my improvement.

In the drawings, A designates the frame for the lenses, commonly called the "rims," and which have secured on their inner sides the bridge-supporting posts B, which have their heads C formed with a groove D. In these grooves are placed the open ends E of the adjustable bridge F, which is bent from two pieces of wire G and G' to form the curved portions H and the short arms J, which are bent outward in the same line as the rims and have their long terminals K bent around so as to be parallel therewith and at right angles to the rims. These terminals are much longer than the short arms J and have secured to their ends the standards L and L', the standard L having an opening M in its center, through which passes the terminal carrying the standard L', which is formed with the opening M' near the end, through which passes the terminal carrying the other standard L. These standards are both provided with a groove or slot N in their inner ends, which engage and have the short arms sliding therein and, in connection with the openings in the standards, form guides for the short arms and their terminals to slide in.

Upon the terminal which is secured to the standard L, I place a spiral adjusting-spring O, which allows the lens frames or rims to be spread apart and which exerts a tension to push the standards L and L' apart, thus bringing the lenses nearer together and forcing the nose-cushions P in contact with each side of the nose. These nose-cushions are secured to metallic strips P', which are secured to the curved flat arms Q, which are formed with openings R in their ends. Screws S are placed through the openings in the ends of the arms Q and the open ends E of the adjustable bridge and securely hold the same in the groove of the posts B on the rims.

Figure 3:
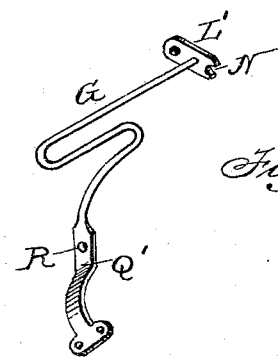

In the modified form shown in Fig. 3 I make the flat curved arms Q' integral with the ends of the bridge-adjusting means, whose ends are simply flattened and are secured in the grooves on the post B.

From this description, taken in connection with the drawings, it will be seen that I provide an adjustable eyeglass which is adapted to fit any size nose, a means which will always keep the lenses, no matter how far apart, in the same parallel line, and which is extremely simple, durable, and cheap, thus rendering the device very useful and practical.

I claim—

1. An eyeglass consisting of the lens-frames having the posts or lugs projecting from the sides thereof and the adjusting devices secured on said posts or lugs, consisting of two pieces of wire each being bent to form the curved portions, the short arms and long terminals, said short arms and terminals being bent parallel to each other but at right angles to the curved portions, the standards having the openings to receive the ends of the long terminals, and guides for the long terminals and short arms to slide in, a spiral spring placed on one of the long terminals so as to be in between the standards to press them apart and draw the lens-frames together and the lower ends of said pieces or members being flattened and carrying each a nose-cushion.

2. An eyeglass consisting of the lens-frames having the posts or lugs projecting therefrom having openings in their ends, two wire members forming the nose-bridge and adjusting and holding device, each member consisting of the curved nose portion terminating in the short and long parallel arms, standards having openings therein, the end of one of the long terminals or arms, passing through the central opening of one of the standards and secured in the central opening of the other standard, and the end of the other passing through the outer opening of the standard to which the end of the other long arm is secured and having its end secured in the corresponding outer opening of the other standard, a spiral spring placed on the last-mentioned long arm or terminal between the standards and adapted to press the standards apart and thus bring the lens-frames together, and the nose-cushions attached to the lower ends of the two members forming the nose-bridge.

In testimony whereof I affix my signature in presence of two witnesses.

WILLIAM N. BLANCHARD.

Witnesses:
WILLIAM V. CORBY,
OZIAS MILLIGAN.